United States Patent [19]

Wehrenberg et al.

[11] Patent Number: 5,124,287

[45] Date of Patent: Jun. 23, 1992

[54] ZIRCON REFRACTORIES WITH IMPROVED THERMAL SHOCK RESISTANCE

[75] Inventors: Thomas M. Wehrenberg, Jeffersonville; Charles N. McGarry, Clarksville, both of Ind.; Sylvie Mahe, Fresnes, France; Douglas A. Drake, Buckhannon W.V.

[73] Assignee: Corhart Refractories Corporation, Louisville, Ky.

[21] Appl. No.: 608,597

[22] Filed: Oct. 31, 1990

Related U.S. Application Data

[63] Continuation of Ser. No. 404,819, Sep. 8, 1989, abandoned.

[51] Int. Cl.$^5$ ............................................. C04B 35/48
[52] U.S. Cl. .................................. 501/106; 501/102; 501/103
[58] Field of Search ................................. 501/105, 106

[56] References Cited

U.S. PATENT DOCUMENTS 2,553,265  5/1951  Mochel .............................. 501/106
4,579,829  4/1986  Garvie .............................. 501/106

FOREIGN PATENT DOCUMENTS 0668925  6/1979  U.S.S.R. .............................. 501/106

OTHER PUBLICATIONS

Guide to Selecting Engineered Materials, Special Issue of Advanced Materials and Processes, pp. 82–83 vol. 2 (1) Mid–Jun. 1987.

*Primary Examiner*—William R. Dixon, Jr.
*Assistant Examiner*—C. Melissa Bonner
*Attorney, Agent, or Firm*—Panitch, Schwarze, Jacobs & Nadel

[57] ABSTRACT

Dense zircon refractories having improved thermal shock damage resistance for use in glass melt or high alkali vapor contact applications comprise, and, consist essentially of, about fifty percent by weight or more $ZrSiO_4$, at least about one percent zirconia in particle form distributed substantially uniformly throughout the composition of the refractory, and optionally, a zircon grain growth enhancing composition, preferably $TiO_2$.

35 Claims, No Drawings

ZIRCON REFRACTORIES WITH IMPROVED THERMAL SHOCK RESISTANCE

This application is a continuation of U.S. patent application Ser. No. 07/404,819 filed Sep. 8, 1989, now abandoned.

FIELD OF THE INVENTION

The invention relates to zircon ($ZrSiO_4$) refractories and, in particular, to low porosity zircon refractories having improved thermal shock damage resistance while maintaining or offering improved high glass corrosion resistance.

BACKGROUND OF THE INVENTION.

Zircon refractory bodies are often used in glass production due to the superior corrosion resistance of that material.

Generally speaking, glass corrosion resistance of the refractory is enhanced by increasing density and concentration of the zircon to eliminate pores which may permit melted glass or slag intrusion and to eliminate other refractory components having less glass corrosion resistance than the zircon. The pores and other components each provide potential sites for corrosion and/or erosion to begin.

Densification of zircon has been obtained by sintering a mixture of zircon ($ZrSiO_4$) with titania ($TiO_2$), iron oxide (FeO) and/or other zircon grain growth enhancing composition(s). When fired at a sufficiently high temperature, between about 1500° C. and 1600° C., some of the individual zircon crystals grow in size by the absorption of other zircon crystals, while the bulk volume and porosity of the material decrease and the bulk density of the material increases. Pure zircon refractories fired without a densifying agent like titania have a maximum bulk density of only about 245 lbs/ft$^3$. Bulk densities of up to 270 lbs/ft$^3$ and more have been achieved using titania as a densifying agent.

The densification of the zircon also appears to be directly proportional to the amount of titania present. As little as about 0.6 or 0.7 percent by weight titania may be sufficient for maximum densification of zircon. However, because theoretically uniform distribution cannot be achieved in practice, about one percent by weight is typically added to zircon for optimum densification. Some densification can be observed with as little as about 0.1 percent by weight titania addition. Excess titania may remain in particle form, be reduced to metallic titanium or possibly combine with other compounds which may be present during sintering.

The term "sinterable components" is used to refer to metals, metallic oxides, glasses and other materials in a sinterable mix or green shape which remain in a refractory in some form after sintering. These are distinguished from water, volatiles and combustibles which evaporate or are driven out of the composition or consumed (oxidized to a gaseous form) before or during the sintering process. The term "refractory components" is used to refer to the "sinterable components" in the form(s) in which they remain in the refractory after sintering.

The purification and densification of zircon to increase corrosion resistance typically reduces that material's resistance to thermal shock damage. Thermal shock damage is physical damage such as spalling, cracking and/or fracturing resulting from rapid and/or extreme temperature changes.

Normally, thermal shock damage resistance of dense ceramic bodies can be improved to a certain degree by various means, particularly by using coarse aggregates. Other means include increased porosity (open or closed), providing heterogeneous particle densities or chemically changing the base material in the matrix by forming a solid solution of it with another material.

The thermal shock damage resistance of densified zircon has been heretofore improved by the addition of coarse aggregates, namely densified zircon grog (prereacted zircon). Dense zircon blocks have been produced this way for use in or in connection with glass furnaces, for example as furnace linings and other glass and slag contact applications such as distribution channels and retainers for platinum bushings used for forming glass fibers. Such zircon refractories are used particularly in the production of textile (E) glass fiber, borosilicate (e.g. Pyrex®) glasses and certain other specialty glasses which are considered especially corrosive. Porous, undensified ("pressed brick") zircon refractories have also found use in non-glass contact structures above the tanks of such furnaces as zircon resists alkali vapors generated by these processes.

In using coarse aggregates to enhance thermal shock resistance in refractories one balances improving thermal shock damage resistance to achieve a minimum acceptable service level with avoiding diminished long-term corrosion/erosion ("wear") resistance. It should be noted with respect to the latter characteristic that increasing the content of coarse aggregate may also increase the likelihood of wear and even damage due to stoning.

To reduce the likelihood of damage from thermal shock in such prior, densified zircon refractories used, for example, as glass furnace linings, furnace operators have had to carefully control and modify their operating procedures, for example, by providing extremely slow furnace heat-up and cool-down rates, using pressurized heat, etc. It was not uncommon for prior densified zircon refractory blocks forming the lining of such glass melting furnaces to crack during the initial heat-up of the furnace, even when such special precautions were taken. Since such furnaces are intended to be in continuous operation for years, even relatively minor thermal shock damage leading to accelerated localized wear (corrosion/erosion) and early furnace shutdown can have a significant impact on the economics of the furnace.

It would be highly valuable to provide densified zircon refractories having glass corrosion resistance at least comparable to if not greater than that of current densified zircon refractory compositions used in glass furnace applications while providing improved thermal shock resistance.

SUMMARY OF THE INVENTION

In one aspect, the invention comprises a zircon refractory composition comprising at least about fifty percent by weight $ZrSiO_4$ and at least about one percent by weight zirconia in particle form dispersed substantially uniformly throughout the composition.

In another aspect, the invention comprises a method of making a zircon refractory having improved thermal shock damage resistance comprising the steps of forming a green composition of mixed sinterable components into a shape, the sinterable components comprising a mixture at least about fifty percent by weight ZrSiO$_4$ provided by zircon particles, and at least about one percent by weight zirconia particles; and heating the green composition shape to a temperature of at least about 1400° C. throughout to sinter the zircon composition while retaining the zirconia in particle form. The invention further includes the sintered refractory shape formed by the aforesaid method.

In another aspect, the invention includes a glass melt furnace having a sintered refractory composition shape positioned for melted glass or alkali vapor contact, the composition comprising at least about fifty percent by weight ZrSiO$_4$ and at least about one percent by weight zirconia in particle form dispersed substantially uniformly through the composition.

DETAILED DESCRIPTION OF EMBODIMENTS

It has been found that resistance to thermal shock damage in densified zircon refractories can be noticeably and even greatly improved by relatively minor additions of relatively fine particulate zirconia with at least no immediate apparent loss in glass corrosion resistance and at relatively little additional cost.

This improvement in thermal shock damage resistance is believed to be due to the unique thermal expansion characteristics of unstabilized zirconia which undergoes a phase change from monoclinic form to tetragonal form when heated to about 1160° C. and above, with corresponding changes in thermal linear expansion rate and magnitude. Normally, unstabilized zirconia will convert from a tetragonal form back to the monoclinic form and expand during the conversion when cooled below about 1160° C. However, it has been found in the present invention that some of the unstabilized zirconia remains trapped in a tetragonal phase when the composition is cooled below 1160° C. It has been found in the one sintered sample composition examined by X-ray analysis that about twenty-five percent or more of the unstabilized zirconia present was in tetragonal form at room temperature.

Due to the substantially different thermal expansion characteristics (rate and magnitude) of the zircon and monoclinic form zirconia, zonal stress concentrations are formed in the cooling densified zircon matrix by the zirconia particles, which are dispersed substantially uniformly throughout the densified matrix when they begin to convert and expand. The thermal expansion coefficient of tetragonal form ZrO$_2$, $5.5 \times 10^{-6}$ in./in./°C. (compared to $0.7 \times 10^{-6}$ in/in/°C. for monoclinic form) is similar to the $7.5 \times 10^{-6}$ in/in/°C. coefficient for zircon. It is believed that this similarity causes the retention of at least some of the unstabilized zirconia in the tetragonal form during thermal cycling. It is believed that the crystal growth which ZrO$_2$ undergoes in converting from the tetragonal to the monoclinic form more than offsets the small difference in thermal expansion between zircon and the tetragonal form ZrO$_2$ which keeps the ZrO$_2$ under compression during cooling through the transformation zone, preventing its conversion to monoclinic form. It is further believed that this metastable tetragonal form of ZrO$_2$, which is being observed at room temperature, can be or is transformed to monoclinic form when relieved of stress, for example by cracking of the surrounding matrix. The zonal stress concentrations act as "crack stoppers" affecting the thermal shock resistance of the entire refractory in a positive manner. This is believed to, in effect, stress relieve the body and enhance the body's resistance to crack propagation under thermal stress upon reheating.

Refractory compositions of the present invention comprise at least about fifty percent by weight ZrSiO$_4$ and at least about one percent by weight zirconia in particle form disbursed substantially uniformly through the composition. Preferably, the ZrSiO$_4$ is in the form of aggregated zircon particles. Desirably, the refractable compositions comprise about twenty-five percent by weight or less zirconia in particle form. The refractable compositions of the present invention also desirably comprise about seventy-five percent by weight or more aggregated zircon particles. Preferably, the refractory compositions of the present invention comprise about ninety percent or more by weight aggregated zircon particles and about ten percent or less by weight zirconia particles. Optionally, the refractory compositions further comprise a zircon green growth enhancing composition, preferably titania in an amount constituting about two percent by weight or less of the refractory composition. Preferably, the majority of the ZrSiO$_4$ is present in zircon particles having average sizes of about ten microns or less. Preferably, the refractory composition consists essentially of zircon, zirconia and optionally, zircon grain growth enhancing composition.

According to the invention, green shapes are formed from compositions of mixed sinterable components comprising at least about fifty percent by weight ZrSiO$_4$ with at least about one percent by weight zirconia and, optionally, a zircon grain growth composition, preferably titania, all in particle form. Depending upon their compositions, these particles are suggestedly uniformly mixed by intense mechanical mixing or spray drying and formed dry into shapes or, preferably, combined with appropriate binders and/or lubricants (e.g. one percent by weight polyethylene glycol liquid solution plus one-half percent by weight polyvinyl alcohol dry powder present as one part dissolved in two parts water) to add green strength, and formed into shapes in conventional ways such as isostatic pressing or slip casting using techniques normally associated with those methods of forming. Compacting pressure in isostatic pressing is suggestedly approximately 10,000 psi or higher. Green compositions with binders and/or lubricants may be dried, if necessary or desired, before firing. Green composition shapes are fired to a temperature sufficiently high to sinter the zircon and sufficiently low to prevent thermal decomposition of the zircon. Firing to a temperature of at least about 1400° C. and no more than about 1650° C. are suggested and between about 1500° C. and 1600° C. are preferred to achieve maximum densification and bonding without decomposition. After firing, larger blocks of the sintered composition (typically about 1 to 5 ft$^3$) may be used directly or cut or ground to tight dimensional tolerances with diamond blades or diamond grinding wheels for use in the tank lining, the superstructure, the forehearth, etc.

Preferably, a major proportion of the ZrSiO$_4$ is provided in the sinterable composition by zircon with average particle sizes of about ten microns or less. The sinterable components of most interest consist essentially of about seventy-five to ninety-nine percent by weight ZrSiO$_4$, one to twenty-five percent by weight zirconia in particle form and optionally up to about two percent by weight zircon grain growth enhancing composition. The invention further includes the sinterable refractory shapes by the foregoing methods.

In another aspect, the invention includes a glass melt furnace comprising a sintered refractory composition shape positioned for melted glass or alkali vapor contact, the refractory composition of the shape being at least about fifty percent by weight $ZrSiO_4$ and about one percent by weight zirconia in particle form dispersed substantially uniformly through the composition.

In many glass melt applications, particularly production of borosilicate and specialty glasses, the presence of zircon grain growth enhancing agents and impurities in the refractory composition must be controlled for reasons other than merely maintaining wear resistance. For example, $TiO_2$ levels must be controlled where the blistering potential of that compound is undesirable. Iron oxide levels must be controlled where coloration of molten glass is undesired. Nevertheless, small amounts, typically equal to about one-tenth of one percent by weight, of $TiO_2$ have been found to be acceptably low to avoid blistering and coloration while fostering some grain growth and densification to the zircon particles.

To the extent that sinterable or refractory components (including zircon grain growth enhancers) other than zircon particles and zirconia particles are present, they suggestedly should constitute less than about ten percent by weight, desirably less than about five percent by weight and preferably about two percent or less by weight of the refractory composition if glass corrosion resistance at levels comparable with existing compositions consisting essentially of densified zircon are to be maintained, particularly long-term corrosion resistance. On of ordinary skill will appreciate that the amount of these "other" components which can be tolerated will vary with different use of the compositions, and with cost and the corrosion rates which can be tolerated. The exemplary preferred refractory compositions to be disclosed in the following examples consist essentially of $ZrSiO_4$ in the form of zircon particles (flour or flour and grog), unstabilized zirconia particles and titania particles.

Zircon may be provided in the green compositions by particles of unreacted or unaggregated zircon, aggregated zircon (zircon grog), fused zircon or combinations thereof. Grog is preferably supplied from newly fired refractory rejects of the same or comparable composition (non-densified, partially densified or fully densified).

Zircon flours (opacifier grade zirconium oxide), wet milled from zircon sand and about ninety-seven percent or more by weight $ZrSiO_4$, with a median particle size (50th mass percentile based on sedigraph analysis) of about ten microns or less and having a surface approximately 2 $m^2/g$ or more are suggested to provide the major proportion of the $ZrSiO_4$. Metallurgical grades are available and may be acceptable for certain uses but are not preferred, at least in the particle sizes in which those materials are typically offered by commercial sources. Zircon flour can be obtained from supplies such as TAM Ceramics, Niagara Falls, N.Y.; M&T Chemical Co., Rahway, N.J.; Kreutz of West Germany; and Cookson of Great Britain.

A suggested range of particle sizes for the zircon flour is as follows: at least ninety-five percent by weight less than 325 mesh (forty-four microns); seventy-two to eighty-one percent by weight less than ten microns; forty-eight to fifty-six percent by weight less than five microns; eleven to seventeen percent by weight less than one micron, the latter three by Sedigraph analysis. Zircon flour (opacifier grade zirconium oxide), at least ninety-seven percent by weight $ZrSiO_4$ and having a median particle size (50th mass percentile) of about 4.7 microns and a surface area between about 2.15-2.30 $m^2/g$ was used in the following examples.

In each of the following examples, $ZrSiO_4$ is supplied by zircon flour or mixtures of zircon flour and densified zircon grog (aggregate). However, $ZrSiO_4$ may also be supplied by zircon aggregate which is less than fully densified or even not densified or by fused zircon. It is further believed that zircon grog (not densified and/or with any degree of densification) or fused zircon may be used as the exclusive source of $ZrSiO_4$ in compositions of the present invention. At least about ten percent and preferably at least about fifteen percent by weight of such grog or fused zircon should be milled or otherwise reduced to particle sizes of less than about ten microns, and desirably less than about five microns, to provide a fine fraction to replace the zircon flour in filling voids and fostering bonding.

A densified zircon matrix constituting at least about fifty percent by weight $ZrSiO_4$ is viewed as necessary to give the corrosion resistance desired in any conceivable application requiring zircon. Higher percentages of $ZrSiO_4$ (at least about seventy-five percent and suggestedly about eighty-five percent or more) are believed necessary to provide necessary bonding and low open porosity (less than about fifteen percent) to assure glass corrosion resistance at least equivalent to existing densified zircon compositions. The precise amounts of zirconia, titania and other ceramifiable/refractory components which are required or permitted will depend, to a large extent, upon the ultimate application of the refractory composition.

Unstabilized zirconia as used herein includes commercially available fine-grained product which typically include between about one and one-half to two percent $HfO_2$ and between about one and two percent of other components including water and volatiles. Often the $ZrSiO_4$ will also contain trace contaminants in the form of $SiO_2$ and $Al_2O_3$ from the ball mill lining and/or grinding media used to mill it from the natural occurring zircon sand down to the fine particle size required. Thermal shock damage resistance also may be improved by using stabilized zirconias which convert to unstabilized form during heating or repeated heating or mixtures of unstabilized and stabilized zirconias. Zirconia may be "chemically" stabilized by such agents as magnesia, calcia or yttria which bond in the crystalline lattice with the zirconia. This is distinguished from the metastability achieved in the present invention by trapping and mechanically compressing the tetragonal form zirconia in the zircon matrix. Such chemically stabilized zirconias will normally convert to unstabilized form after heating or after repeated heating cycles. However, thermal shock damage resistance improvement is most optimally induced while minimizing the amount of zirconia (to minimize stoning and costs) by using zirconias which are considered fully unstabilized.

Thermal shock damage resistance improvement further appears to be related, at least in some degree, to zirconia particle size. Coarse zirconia particles could be used, for example, up to about 50 mesh, to enhance thermal shock resistance by increasing heterogeneity. However, the resulting body is likely to have preferential glass corrosion of the larger zirconia and zircon particles with the consequent releasing of stones (i.e. the zirconia or zircon particles from the composition). Smaller sizes, preferably median particle size (50th mass percentile of the zirconia by sedigraphic analysis) of about eight microns or less, are suggested for long term wear and optimum thermal shock damage resistance. Agglomeration and bad dispersions were obtained with very fine zirconias. Best comparative results were obtained where the median particle size of the zirconia was between about two and four microns. Unstabilized zirconia can be obtained in such sizes from such sources as SEPR, Lepontet, France; TAM Ceramics, Niagara Falls, N.Y.; Zirconia Sales, Atlanta, Ga.; Magnesium Electron Corp. of Great Britain and others.

The zirconia particles are generally spherical both in their original form when added to the green compositions and in the sintered refractory compositions of the invention. They were further present in about the same amount after sintering. In the fired refractories, the zirconia does not go into solid solution nor is it encapsulated with a glassy phase. Rather, it appears in interstices in the aggregated zircon particle matrix.

In the following examples, metastable tetragonal form zirconia was identified as being present in the sintered refractory by x-ray diffraction analysis. Since zirconia stabilizing oxides were not present or at least not present in amounts sufficient to have stabilized the zirconia to a quadratic tetragonal form, the tetragonal form zirconia present was assumed to be metastable. It is believed that metastable and quadratic tetragonal forms might be distinguished using microprobe analytical scanning electron microscope techniques in which the chemical composition of individual zirconia particles may be analyzed and the presence or absence of zirconia stabilizing oxides about the particle confirmed. Other techniques may be available or become available.

Smaller zirconia particle sizes (two to four micron median particle size) appear to provide an optimum distribution of zonal stress concentrations for the quantity of zirconia present. The zircon matrix may also be sufficiently strong to resist the expansion of larger numbers of such smaller sized particles thus trapping a greater percentage of the particles in the metastable tetragonal form. The smaller particles also appear to contribute to lower porosity. Zirconia appeared to inhibit somewhat the fostering of zircon grain growth in compositions having one percent titania concentrations. Increased refractory composition density (lower porosity) was noted, particularly where less than the optimum one percent ratio of $TiO_2$ was present, with the addition of some zirconia (less than ten percent and optimally about five percent). It is believed that this is a compacting phenomenon caused by the finest components of the zirconia filling the porosity in the zircon.

An indicated previously, zirconia stabilizing oxides such as CaO, $Y_2O_3$, MgO and the like are not necessary but could be used to some extent to accomplish a significant stabilization of the zirconia. Preferably, the green compositions of this invention use unstabilized zirconia and lack zirconia stabilizing agents in amounts sufficient to stabilize the unstabilized zirconia present in the composition. Carbides and other compounds which are known to be highly reactive with molten glass and/or slag should also be avoided.

To assure an optimum presence of titania for maximum densification of the present compositions, a ratio of about one percent by weight $TiO_2$ to one-hundred percent $ZrSiO_4$ is preferred. In applications where blistering is a problem, a maximum ratio of about one-tenth of one percent by weight $TiO_2$ to one-hundred percent by weight $ZrSiO_4$ is preferred. $TiO_2$ remaining after sintering typically appears as titania particles and/or deposits of metallic titanium in the densified zircon interstices.

Pigment grade titanias, about ninety-eight percent $TiO_2$ with a median particle sizes (50th mass percentile based upon sedigraph analysis) of about five microns, are suggested. These can be obtained from such sources as TAM Ceramics and Titanium Pigment Corp., New York, N.Y. Pigment grade titanias having median particle sizes (50th mass percentile) of between about 1.6 microns and 2.8 microns were used in the following examples and are presently preferred. Metallurgical grade titanias are available but are believed to be undesirable, at least due to size, in the products typically offered by commercial suppliers.

Primary uses for refractory compositions of this invention are in the glass industry for inner furnace linings, forehearth distribution channels, and other areas directly contacted by glass or slag, particularly highly corrosive glasses such as textile (type E), borosilicate and certain other specialty glasses. They may also be used as outer (backup or safety) linings, and as other parts and/or in other furnace areas, for example in the superstructure over the furnace and the doghouse, which are not usually in direct glass/slag contact but which may be exposed to high alkali vapor from the next tank. They may find further use in the production of other, less corrosive glasses as well as in other areas where resistance to highly corrosive materials or high alkali vapor is required.

Fifteen exemplary densified zircon refractory compositions with zirconia are disclosed in the following TABLES I, V and IX, together with comparison prior art Compositions A and B, each lacking zirconia. The fifteen example compositions are for illustrative purposes only and are not intended to be restrictive as to the scope of the invention. Generally speaking, each of the refractories was formed by blending the zircon, zirconia and titania particles with polyethylene glycol and polyvinyl alcohol, vibrating to precompress then isostatically pressing the mix. The green blocks were fired to between about 1500° C. and 1600° C. Generally speaking, the compositions of TABLES I and V were fired together. The compositions of TABLE IX were fired in a separate firing.

Some of the important physical properties of the various compositions are further indicated in the tables. Density is bulk density measured following ASTM C-20-74. Open (apparent) porosity is measured following ASTM C-20-74 modified: one inch cube samples are boiled in water for two hours. Total porosity was calculated based upon theoretical density and bulk density. Modulus of rupture ("MOR") is measured following ASTM C-133-72.

Thermal shock resistance is determined by cycling sintered bars approximately one inch by one inch by three inches (about 2.5×2.5×7.6 cm.) between seated positions directly on a steel plate at room temperature and on a refractory brick in a furnace preheated to a temperature of about 1150° C., 1250° C. or 1400° C. at fifteen-minute intervals (i.e. fifteen minutes in the furnace followed by fifteen minutes on the plate followed by a return to the furnace). A sample is considered to fail the thermal shock test if, at any time during any cycle, it sustains a twenty-five percent or more weight loss. Mere cracking of the sample without separation does not constitute a failure for the purpose of this test. Samples surviving upshock in the furnace but not removal from the furnace are awarded one-half cycle. Samples failing while cooling are also awarded one-half cycle. Samples surviving return to furnace are awarded a full cycle.

Glass corrosion rating is determined following ASTM C-621 (modified) for Type E (textile) glass and other type glasses. According to this test a refractory sample approximately one cm. by one cm. by five cm. is immersed to a depth of about 1.25 cm. in a bath of molten glass for a five day period. At the end of the period, the sample is removed, split longitudinally and the depth of material loss from corrosion/erosion ("cut") on each half sample measured at the molten glass/air interface. The average cut of one sample is selected as a standard. The ratio of the selected average cut to the cut of each other sample when multiplied by 100 is the rating of the other sample with respect to the selected sample. In this way, ratings of less than 100 represent greater corrosion loss than that of the selected standard while ratings above 100 represent lesser corrosion loss than that of the selected standard. The textile glass corrosion ratings of the Example Compositions 1-9 of TABLES I and V are relative to comparison Composition A of TABLE I. The borosilicate glass corrosion rating of Example 9 is with respect to Comparison Composition B, both in TABLE V. Comparison Compositions A and B were assigned glass corrosion ratings of 100 for textile and for borosilicate glass, respectively.

One of ordinary skill appreciates that individual sample tests of this type are only generally indicative due to variations in the samples themselves and the difficulty of identically reproducing test conditions. Further, they only indicate short term corrosion resistance. There is still concern that long term glass corrosion resistance of the compositions will prove to be more directly related to the zircon content.

Accordingly, compositions having the highest $ZrSiO_4$ content while providing some thermal shock damage resistance improvement or the necessary thermal shock damage resistance are preferred.

At least one block of each composition about 9 in. ×4.5 in.×2.5 in. were prepared. Two sample portions were taken from the same block for each reported test. Average values for two samples are presented for bulk density ("Avg. Density"), apparent (open) porosity ("Avg. App. Porosity") and MOR ("Avg. MOR"). Values representing an average of at least two specimens are presented for "Thermal Shock Resistance Cycles" and "Glass Corrosion Resistance Rating". Because of the number of samples involved, not all tests were performed on all samples. Asterisks are used in the following TABLES to indicate tests which were not performed.

All indicated percentages in the following TABLES, except porosity, are by weight.

EXAMPLES 1 THROUGH 7 (TABLE I)

High density zircon refractory compositions were prepared from mixtures of ceramifiable components consisting essentially of zircon (zircon flour or zircon flour and zircon grog) with titania at a uniform weight ratio (about 100 to 1), and with varying amounts of unstabilized (monoclinic) zirconia (zero to seventy-five percent), all in particle form. The specific proportions by weight of the ceramifiable components are indicated in the TABLE I.

Typical chemistry for sintered Composition A is indicated in TABLE III and is about ninety-seven percent or more by weight $ZrSiO_4$, about one percent by weight $TiO_2$ and the remainder (less than about two percent) other ceramic components, mainly metallic titanium, free $SiO_2$ and $Al_2O_3$ and other metallic oxides. $ZrSiO_4$ and $TiO_2$ are believed to reduce roughly in proportion to the zirconia additions in the Examples 1 through 7. Thus Examples 1 through 7 after sintering ranged between about ninety-three and twenty-two percent $ZrSiO_4$, respectively. $ZrSiO_4$ content is typically determined by standard differencing techniques identifying and quantifying the other components of the composition.

TABLE I

| Sample | ZIRCON (w/$TiO_2$) | | | | | | | |
|---|---|---|---|---|---|---|---|---|
| | A | 1 | 2 | 3 | 4 | 5 | 6 | 7 |
| Zircon Flour, % | 89.1 | 84.6 | 80.2 | 75.7 | 71.3 | 66.8 | 49.5 | 24.75 |
| Finer Grog (w/$TiO_2$), % | 10 | 9.5 | 9.0 | 8.5 | 8.0 | 7.5 | — | — |
| $TiO_2$, % | .9 | .9 | .8 | .8 | .7 | .7 | 1.0 | 1.0 |
| $ZrO_2$, % (Z4) | 0 | 5 | 10 | 15 | 20 | 25 | 49.5 | 74.75 |
| Density, lbs/ft$^3$ | 273 | 270 | 264 | 258 | 254 | 249 | * | * |
| gms/cc | 4.37 | 4.32 | 4.23 | 4.13 | 4.07 | 3.99 | * | * |
| Open Porosity, % | .4 | 3.2 | 7.4 | 10.3 | 12.7 | 14.1 | * | * |
| Total Porosity, % | 4.2 | 6.1 | 9.3 | 12.3 | 14.5 | 16.9 | * | * |
| MOR, at Rm T°, Psi | 15000 | 14000 | 11200 | 10900 | 9400 | 11900 | * | * |
| Thermal Shock Resistance | | | | | | | | |
| Cycles RT - 1150° C. | 0 | 10 | 20+ | 20+ | 20+ | * | * | * |
| Cycles RT - 1250° C. | 0 | .5 | 20+ | 20+ | * | * | * | * |
| Cycles RT - 1400° C. | 0 | 0 | 1 | 11 | 18.5 | 20+ | * | * |
| Glass Corrosion Resistance | | | | | | | | |
| Textile Glass, 1500° C. 5 days Rating | 100 | 100 | 97 | 93 | 95 | 115 | * | * |

* Not determined.
(Samples 6 and 7 cracked during initial firing)

TABLE II

| Type | Z1 Baddeleyite | Z2 Monocl. fused ZrO2 | Z3 Monocl. fused ZrO2 | Z4 Monocl. fused ZrO2 | Z5 Monocl. fused ZrO2 | Z6 Baddeleyite |
|---|---|---|---|---|---|---|
| | | | Zirconia Type | | | |
| Median Part. Size (micron)[1] | 1.25 | 1.8 | 2.2 | 3.8 | 5.8 | 8 |
| Spec. Area (m²/g) | 3 | 4.2 | 3 | 2.3 | 1.3 | .6–1 |
| $SiO_2$ | .16 | .9 | .55 | 0.5 | .45 | .30 |
| $Na_2O$ | .03 | — | .15 | 0.2 | .10 | .03 |
| $Al_2O_3$ | .05 | .3 | .11 | 0.1 | .07 | .05 |
| $TiO_2$ | .17 | .2 | .11 | 0.1 | .09 | .17 |
| $Fe_2O_3$ | .09 | .06 | .05 | .05 | .03 | .09 |
| CaO | — | — | .05 | .05 | .03 | — |
| MgO | — | — | .01 | .03 | .01 | — |
| $P_2O_5$ | — | — | .04 | .04 | .04 | — |
| $SO_4$ | .02 | — | — | — | — | — |
| $ZrO_2$ + $HfO_2$ (by difference) | 99.3 | 98.0 | 98.6 | 98.5 | 98.9 | 99.3 |

[1]Sedigraph Analysis
[2]BET Analysis

TABLE III

Finer Grog ($ZrSiO_4$ w/ $TiO_2$) Typical Chemistry

| | Wt. % |
|---|---|
| $ZrSiO_4$ | 98.0 |
| $TiO_2$ | 1.0 |
| Other | 1.0 |

TABLE IV

Finer Grog ($ZrSiO_4$ w/ $TiO_2$) Typical Particle Size Distribution

| Tyler Mesh No. | Cum. Wt. % on Screen |
|---|---|
| 70 | 40 |
| 100 | 60 |
| 150 | 70 |
| 200 | 80 |
| 325 | 85 |
| −325 | 100 |

The chemistry and particle size distribution of the zirconia powder Z4 used in comparison Composition A and in each of the Examples 1 through 7 are set forth in TABLE II. The chemistry and particle distribution of the finer zircon grog (w/$TiO_2$) used are set forth in TABLES III and IV, respectively.

Noticeable improvement to thermal shock damage resistance was observed by the addition of as little as five percent by weight unstabilized zirconia (an average of 10 cycles at 1150° C. by Example 1 versus no cycles by comparison Composition A). Although no test data is provided for compositions employing less than five percent by weight unstabilized zirconia, the increase in thermal shock cycling at 1150° C. and 1250° C. with the addition of only five percent zirconia and the further increase with the addition of only ten percent zirconia, strongly suggests that observable improvement in thermal shock damage resistance at the lower temperatures (e.g. 1150° C. or less) ca be achieved in these compositions by the use of less than five percent zirconia even by the use of as little as about one percent, preferably unstabilized zirconia.

Although the data is limited and only generally rather than specifically representative of each of the compositions, the textile glass corrosion resistances of comparison Composition A and Examples 1 through 5 of TABLE I are judged to be generally comparable to one another, at least as far as these short term textile glass corrosion tests indicate.

In addition to maintaining the superior textile glass corrosion resistance of prior compositions, another benefit of the compositions of TABLE I is that they also can be prepared directly from commercially available raw materials and firing rejects which require only sizing of the particles prior to mixing, forming and firing.

The compositions of TABLE I are viewed as being most useful in the high wear locations of the exposed inner lining (melting areas) of tanks of textile glass fiber and certain specialty glass furnaces and the forehearths. These areas constitute about seventy-five percent of the exposed inner area of the furnace. Composition 2 with about ten percent unstabilized zirconia and about ninety (eighty-eight or more) percent $ZrSiO_4$ is currently preferred. That composition provides significant thermal shock damage resistance (20+ cycles at 1150° C. and 1250° C.) with low porosity while minimizing zirconia content to minimize cost and possible stoning.

EXAMPLES 8 AND 9

TABLE V illustrates the effect of adding unstabilized zirconia to zircon compositions "without" titania, where the blistering potential of $TiO_2$ could be a problem.

Composition B and Examples 8 and 9 of TABLE V were prepared in a manner identical to Composition A and Samples 1 through 7 of TABLE I using the different ingredients indicated in TABLE V. A preferred ratio of about one part by weight titania to one thousand parts by weight $ZrSiO_4$ was maintained. The chemical composition and typical particle size distributions of the finer and coarser mesh grogs used are indicated in TABLE VI and in TABLES VII and VIII, respectively.

TABLE V

ZIRCON (w/o $TiO_2$)

| Sample | B | 8 | 9 |
|---|---|---|---|
| Zircon flour, % | 84.9 | 79.9 | 74.9 |
| Coarser Grog ("Tio2 Free"), % | 10 | 10 | 10 |
| Finer Grog ("TiO2 Free"), % | 5 | 5 | 5 |
| $TiO_2$, % | .1 | .1 | .1 |
| $ZrO_2$, % (Z3) | 0 | 5 | 10 |

TABLE V-continued

| | ZIRCON (w/o TiO$_2$) | | |
|---|---|---|---|
| Sample | B | 8 | 9 |
| Density, lbs/ft$^3$ | 245 | 267 | 262 |
| gms/cc | 3.92 | 4.28 | 4.20 |
| Open Porosity, % | 9.0 | 4.7 | 9.2 |
| Total Porosity, % | 14.0 | 7.3 | 10.0 |
| MOR at Rm T°, Psi | 6800 | 10200 | 6700 |
| Thermal Shock Resistance | | | |
| Cycles RT - 1150° C. | 0 | 10 | 20 |
| Cycles RT - 1250° C. | 0 | 1.5 | 20 |
| Cycles RT - 1400° C. | 0 | * | * |
| Glass Corrosion Resistance | | | |
| Textile Glass, 1500° C. 5 days Rating | 96 | 108 | 113 |
| Borosilicate glass, 1500° C. 5 days Rating | 100 | * | 140 |

TABLE VI

Grog (ZrSiO$_4$ "TiO$_2$ free")
Typical Chemistry

| | Wt. % |
|---|---|
| ZrSiO$_4$ | 98.8 |
| TiO$_2$ | .2 |
| Other | 1.0 |

TABLE VII

Finer Grog (ZrSiO$_4$ "TiO$_2$ free")
Typical Particle Size Distribution

| Tyler Mesh No. | Cum. Wt. % on Screen |
|---|---|
| 70 | 50 |
| 100 | 70 |
| 150 | 80 |
| 200 | 90 |
| 325 | 95 |
| −325 | 100 |

TABLE VIII

Coarser Grog (ZrSiO$_4$ "TiO$_2$ free")
Typical Particle Size Distribution

| Tyler Mesh No. | Cum. Wt. % on Screen |
|---|---|
| 20 | 65 |
| 30 | 85 |
| 35 | 95 |
| 70 | 98 |
| 100 | 100 |

Typical chemistry of Composition B is indicated in TABLE VI, which is also the chemistry of the grog employed. Again, ZrSiO$_4$ and TiO$_2$ content of the sintered Compositions 8 and 9 are believed to be reduced generally in proportion to the additions of zirconia in Examples 8 and 9.

Again, measurable thermal shock damage resistance improvement is seen over the baseline comparison, prior art Composition B, by the addition of only five percent unstabilized (monoclinic) zirconia. Further improvement was achieved by increasing the zirconia content to ten percent. The textile glass corrosion ratings of Compositions B, 8 and 9, the latter with up to about ten percent zirconia (about ninety percent or more ZrSiO$_4$), were judged to be comparable to that of the comparison Composition A and Examples 1-5 of TABLE I, again for at least the short term. Borosilicate glass corrosion resistance is also listed for comparison Composition B and Example Composition 9. The latter showed markedly superior performance in comparison to comparison Composition B. Corrosion tests were not run on Example 8 samples. However, because of the lower porosity, lower zirconia content and greater density, the borosilicate glass corrosion rating of Example 8 is expected to be comparable if not greater than that of Composition 9. This result is attributed to the compacting phenomenon resulting in increased density and reduced porosity (total) in the Example 9 (and 8) composition(s). Furthermore, Example 9 was the only sample tested not to indicate observable stoning (borosilicate testing only), which is quite important.

The compositions of TABLE V are also expected to be most useful for the greater part of the exposed inner lining (direct glass and/or slag contact) in the melting area of borosilicate glass and certain other specialty glass furnace tanks and the forehearth areas, together constituting about approximately seventy-five percent of the exposed inner lining of the furnace. These compositions could also be used in areas where there is no sustained or regular glass contact such as the superstructure and the above doghouse.

EXAMPLES 10 THROUGH 15

TABLE IX indicates the sinterable components and physical properties of dense zircon compositions including a preferred ten percent zirconia and one percent titania content, illustrating the effects of varied average zirconia particle sizes on strength and thermal shock damage resistance. The samples were prepared in the same way as were the samples of TABLES I and V with the ratios of Example 2.

TABLE IX

| | ZIRCON (w/ TiO$_2$) + 10% ZrO$_2$ | | | | | |
|---|---|---|---|---|---|---|
| | Sample | | | | | |
| | 10 | 11 | 12 | 13 | 14 | 15 |
| Zirconia Type | Z1 | Z2 | Z3 | Z4 | Z5 | Z6 |
| Avg. Part. Size, um | 1.25 | 1.8 | 2.2 | 3.8 | 5.8 | 8 |
| Surf. Area, m$^2$/g | 3 | 4.2 | 3 | 2.3 | 1.3 | .6-1 |
| Density, lbs/ft$^3$ | 269 | 266 | 265 | 262 | 259 | 256 |
| gms/cc | 4.31 | 4.26 | 4.24 | 4.20 | 4.15 | 4.10 |
| Open Porosity, % | 3.2 | 3.7 | 4.1 | 5.8 | 9.2 | 11.6 |
| Total Porosity, % | 7.5 | 8.5 | 8.9 | 9.9 | 10.9 | 12 |
| MOR, at RmT°, Psi | 11000 | 11900 | 11800 | 11600 | 12600 | 6200 |
| Thermal Shock Resistance | | | | | | |
| Cycles RT - 1150° C. | 10 | 20+ | 20+ | 20+ | 20+ | 0 |
| Presence of Cracks after TS | Few | No | Yes | Yes | Yes | Yes |

Although Example 15 employing baddelyite with a median particle size of eight microns survived sintering, it was unable to sustain reheating. It also had a significantly lower MOR than the other Examples 10-14. The second baddelyite sample (Example 10) fared better, surviving ten cycles. However, each of the other Examples 11-14, employing fused zirconia were able to survive 20 full cycles at 1150° C.

The superior performance of Examples 11-14 compared to that of 10 and 15 is believed to be due primarily to particle size rather than to the substitution of fused zirconia for baddelyite. The finer baddelyite in Example 10 tended to agglomerate and the coarser baddelyite in Example 15 was believed to be too large for optimal performance. It is believed the larger sized particles provided fewer stress concentration sites and were harder to trap in the metastable tetragonal state. While the concentration of the larger zirconia particles might be increased to compensate it is believed that this would not provide stress concentrations equivalent to those provided by smaller zirconia particles and might also adversely effect th physical integrity of the refractory. The fused zirconia appears to have an aggregate structure in the two to four micron range which also may have a beneficial effect on the sintered product. Compositions 11 and 12 were preferred overall.

It will be recognized by those skilled in the art that changes could be made to the above-described embodiments of the invention without departing from the broad inventive concepts thereof. It is understood, therefore, that this invention is not limited to the particular embodiments disclosed, but it is intended to cover any modifications which are within the scope and spirit of the invention, as defined by the appended claims.

We claim:

1. A dense zircon refractory with high glass corrosion resistance having improved thermal shock resistance produced by a method comprising the steps of:
   forming into a shape a green composition of mixed sinterable components in particle form, the mixed sinterable components consisting essentially of about 75% to 95% by weight zircon and about 5% to 25% by weight zirconia with one or more zircon grain growth enhancing agents including $TiO_2$, the sinterable components collectively including at least 0.10% by weight $TiO_2$; and
   firing the shape to a temperature throughout of between about 1400° C. and 1650° C. for a time sufficient to sinter the zircon.

2. The refractory produced by the method of claim 1 wherein the zircon grain growth enhancing composition comprises particles of titania added to the mixture in addition to the zircon and zirconia components in an amount between about 0.1% and 4% of the weight of the zircon component.

3. The refractory produced by the method of claim 1 wherein the zircon component includes aggregated zircon particles in an amount up to 15% by weight of the sinterable components, the aggregated zircon particles having a median particle size greater than 325 Tyler mesh.

4. The refractory produced by the method of claim 1 wherein the zircon constitutes between about 85% and 95% by weight of the sinterable components.

5. The refractory produced by the method of claim 1 wherein the sinterable components collectively consist of, by weight, about 72 to 94% $ZrSiO_4$, about 5 to 25% $ZrO_2$ and $HfO_2$, 0.10 to about 4% $TiO_2$ and about 5% or less other materials.

6. The refractory produeced by the method of claim 1 wherein the median particle size of the zirconia is more than 1 and less than 8 microns.

7. The refractory produced by the method of claim 6 wherein the sinterable components collectively consist of, by weight, about 72 to 94% $ZrSiO_4$, about 5 to 25% $ZrO_2$ and $HfO_2$, 0.10 to about 4% $TiO_2$ and about 5% or less other materials.

8. The refractory produced by the method of claim 7 wherein the median particle size of the zircon is greater than the median particle size of the zirconia.

9. The refractory produced by the method of claim 8 wherein the median particle size of the zirconia is between about 2 and 4 microns.

10. The refractory produced by the method of claim 9 wherein at least 5% by weight of the sinterable components is monoclinic form zirconia.

11. The refractory produced by the method of claim 10 wherein at least about 75% by weight of the sinterable components is zircon flour having a median particle size less than 10 microns and being about 97% or more by weight $ZrSiO_4$.

12. The refractory produced by the method of claim 11 wherein the zircon component is a mixture of the zircon flour and aggregated zircon particles, the aggregated zircon particles being present in an amount up to 15% by weight of the sinterable components and the aggregated zircon particles having a median particle size greater than 325 Tyler mesh.

13. The refractory produced by the method of claim 12 wherein the sinterable components include up to about 2% by weight zircon grain growth enhancing agents.

14. The refractory produced by the method of claim 11 wherein the sinterable components collectively consist of, by weight, about 82 to 94% $ZrSiO_4$, about 5 to 15% $ZrO_2$ $HfO_2$, 0.10 to about 2% $TiO_2$ and about 1 to 3% other materials.

15. A dense zircon refractory with high glass corrosion resistance having improved thermal shock resistance produced by the method comprising the steps of:
   forming into a shape a green composition of mixed sinterable components in particle form, the mixed sinterable components consisting essentially of about 75% to 95% by weight zircon particles and about 5% to 25% by weight zirconia particles with one or more zircon grain growth enhancing agents including $TiO_2$, the zircon particles having a median particle size greater than a median particle size of the zirconia particles; and
   firing the shape to a temperature throughout of between about 1400° C. and 1650° C. for a time sufficient to sinter the zircon.

16. The refractory produced by the method of claim 15 wherein the sinterable components collectively consist of, by weight, about 72 to 94% $ZrSiO_4$, about 5 to 25% $ZrO_2$ and $HfO_2$, 0.10 to about 4% $TiO_2$ and about 5% or less of other materials.

17. The refractory produced by the method of claim 16 wherein the median particle size of the zirconia is more than 1 and less than 8 microns.

18. The refractory produced by the method of claim 17 wherein the median particle size of the zirconia is between about 2 and 4 microns.

19. The refractory produced by the method of claim 18 wherein at least 5% by weight of the sinterable components is monoclinic form zirconia.

20. The refractory produced by the method of claim 19 wherein at least about 75% by weight of the sinterable components is zircon flour having a median particle size less than 10 microns and being about 97% or more by weight $ZrSiO_4$.

21. The refractory produced by the method of claim 20 wherein the zircon component further includes aggregated zircon particles, the aggregated zircon particles being present in an amount up to 15% by weight of the sinterable components and the aggregated zircon particles having a median particle size greater than +325 Tyler mesh.

22. The refractory produced by the method of claim 21 wherein the sinterable components collectively consist of, by weight, about 82 to 94% $ZrSiO_4$, about 5 to 15% $ZrO_2$ and $HfO_2$, 0.10 to about 2% $TiO_2$ and about 3% or less other materials.

23. A dense zircon refractory composition with high glass corrosion resistance having improved thermal shock resistance consisting essentially of:
    about 72 to 94% by weight $ZrSiO_4$,
    at least 0.10% by weight $TiO_2$, and
    about 5 to 25% by weight $ZrO_2$ and $HfO_2$; and the composition being substantially in the form of a matrix of aggregated zircon particles with individual zirconia particles substantially uniformly distributed through the matrix.

24. The composition of claim 23 wherein the $TiO_2$ constitutes between about 0.5% and 2% by weight of the composition.

25. The composition of claim 24 wherein about 2% or more by weight of the composition is monoclinic form zirconia particles.

26. The composition of claim 24 wherein at least a portion of the zirconia particles are in metastable tetragonal form.

27. The composition of claim 23 including about 82 to 94% by weight $ZrSiO_4$ and about 5 to 15% by weight $ZrO_2$ and $HfO_2$.

28. The composition of claim 23 wherein the median size of the zirconia particles is between about 1 and 8 microns.

29. The composition of claim 28 wherein the median size of the zirconia particles is about 4 microns or less.

30. The composition of claim 23 lacking carbides in amounts sufficient to react with molten glass and further lacking zirconia stabilizing agents in amounts sufficient to stabilize all of the zirconia particles in the composition.

31. The composition of claim 30 consisting of about 82 to 94% by weight $ZrSiO_4$, about 5 to 15% by weight $ZrO_2$ and $HfO_2$, 0.10 to about 2% by weight $TiO_2$ and about 3% or less other refractory components.

32. The composition of claim 31 in a monolithic block having a bulk density greater than 245 lbs/ft$^3$ and a weight greater than 245 lbs and being about 0.5 to 2% by weight $TiO_2$.

33. The composition of claim 23 in a monolithic block having a bulk density greater than 245 lbs/ft$^3$ and a weight greater than 245 lbs. and being about 0.5 to 2% by weight $TiO_2$.

34. A dense zircon refractory composition with a high glass corrosion resistance having improved thermal shock resistance consisting of, by oxide analysis:
    about 25 to 33% $SiO_2$,
    about 66 to 72% $ZrO_2$ and $HfO_2$,
    0.10 to about 4% $TiO_2$, and
    about 5% or less other materials; and the composition being substantially in the form of a matrix of aggregated zircon particles with zirconia particles distributed substantially uniformly through the matrix.

35. The refractory composition of claim 34 in a monolithic block having a bulk density greater than 245 lbs/ft$^3$ and a weight greater than 245 lbs and being about 0.5 to 2% by weight $TiO_2$.

* * * * *